United States Patent
D'Alelio

[15] 3,664,992
[45] May 23, 1972

[54] ACRYLIC ESTERS OF HALOGENATED ACETYLENIC DIOLS

[72] Inventor: Gaetano F. D'Alelio, 2011 East Cedar St., South Bend, Ind. 46617

[22] Filed: Dec. 19, 1968

[21] Appl. No.: 785,337

[52] U.S. Cl. ............................ 260/89.5, 117/145, 117/148, 117/155, 161/247, 204/159.22, 260/23.5, 260/30.4, 260/31.2, 260/32.8, 260/33.2, 260/33.6, 260/33.8, 260/47, 260/63, 260/77.5, 260/78.5, 260/83.5, 260/85.5, 260/86.1, 260/86.3, 260/86.7, 260/486, 260/632, 260/633, 260/885

[51] Int. Cl. ........................................... C08f 3/64, C08f 3/66

[58] Field of Search ............................... 260/486 H, 89.5 H

[56] References Cited

UNITED STATES PATENTS

| | | | |
|---|---|---|---|
| 3,055,932 | 9/1962 | Verbanic et al. | 260/486 H |
| 3,255,163 | 6/1966 | Gobran et al. | 260/486 H |
| 3,393,186 | 7/1968 | Groves | 260/89.5 H |

*Primary Examiner*—Harry Wong, Jr.
*Attorney*—Walter J. Monacelli

[57] ABSTRACT

The esters disclosed herein comprise polymerizable acrylic esters of the halogenated acetylenic alcohols,

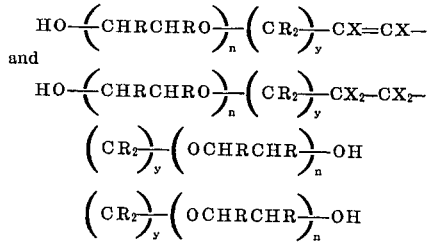

wherein R represents hydrogen preferably or a monovalent hydrocarbon containing one to ten carbon atoms, X is a halogen selected from the class consisting of chlorine and bromine, y represents an integer having a value of 1 or 2, and one n represents zero and the other n represents an integer having a value of 0 to 3, preferably zero. These acrylic monomers are useful for the preparation of self-extinquishing homopolymers and copolymers; the diesters are also particularly useful as cross-linking agents for other monomers and polymers.

14 Claims, No Drawings

ACRYLIC ESTERS OF HALOGENATED ACETYLENIC DIOLS

PRIOR ART

No related prior art is known. Copending application (DA-551) Ser. No. 785,336 filed the same date herewith discloses related acrylic esters of halogenated acetylenic monoalcohols.

BACKGROUND OF THE INVENTION

This invention deals with polymerizable acrylic esters which contain halogen atoms in their structures. In general, it concerns mono- and diacrylic esters of polyhalogenated acetylenic diols. In particular, it deals with the acrylic-type esters of halogenated ethylenic diols selected from the class of

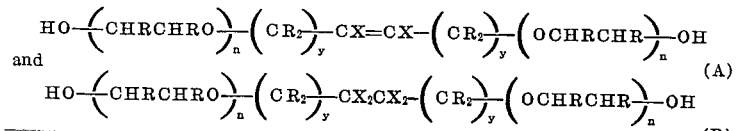

In the above formulas, R represents hydrogen preferably or a monovalent hydrocarbon containing one to 10 carbon atoms, X is chlorine or bromine, y has a numerical value of 1 or 2, and one $n$ represents zero and the other $n$ is an integer having a value of 0 to 3. When the other $n$ is also zero, the ester is symmetrical and is preferable for the practice of this invention. Copending application Ser. No. 785,338 (Docket DA-552B) filed the same date herewith, covers other symmetrical compounds in which $n$ is 1, 2 or 3.

Typical esters of the invention are those in which one or both of the alcoholic hydroxyl groups in formulas (A) and (B) have been replaced by an acryloxy group of the formula,

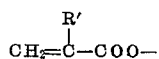

, wherein R' represents hydrogen, methyl and the halogen X as defined hereinabove. These esters are readily prepared by esterifying the alcohols of formulas (A) and (B) with the acrylic chlorides, anhydrides or acids, $CH_2 = C(R')COCl$, $[CH_2 = C(R')CO]_2—O$ and $CH_2 = C(R')COOH$, respectively, by procedures well known in the art. When the acid chloride is used, a hydrohalide acceptor, such as a tertiary amine, as for example, the trialkylamines, dimethylaniline and the like, is preferably used in the reaction.

The halogenated dialcohols of formulas (A) and (B) from which the acrylic esters of this invention are prepared are obtained very readily by the reaction of bromine or chlorine with the acetylenic alcohols corresponding to these formulas. When 1 mole of halogen is reacted with the acetylenic dialcohol, the dihalo-compound is obtained, whereas when 2 moles of halogen are reacted, the tetrahalo compound is obtained:

reaction with aldehydes and ketones, such as for example, with $CH_2O$, $CH_3CHO$, $C_4H_9CHO$, $C_8H_{17}CHO$, $C_9H_{19}CHO$, $C_{10}H_{21}CHO$, $C_6H_5CHO$, $C_6H_{11}CHO$, $CH_3CH = CHCHO$, $C_6H_5CH = CHCHO$, $CH_3COCH_3$, $C_2H_5COCH_3$, $CH_3COC_{10}H_{21}$, $C_{10}H_{21}COC_{10}H_{21}$, etc., as follows:

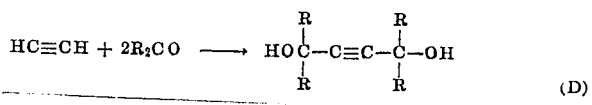
(D)

When, in formula (C), both $n$'s are zero and $y$ is 2, these acetylenic diols have the formula (E), $HOCR_2CH_2C \equiv CCR_2CH_2OH$, and are prepared by reacting acetylene with oxirane compounds,

such as

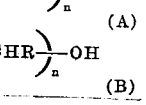

etc., as follows:

$HC \equiv CH + 2R_2C\underset{O}{\overset{}{\diagdown\diagup}}CR_2 \longrightarrow$ $HOR_2CR_2CCH = CHCR_2CR_2OH$ (E)

The reaction of the acetylenic alcohols of formulas (D) and (E) with

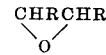

yield the acetylenic dialcohols of formula (C), thus:

Formula (D) + $n$CHRCHR$\underset{O}{\overset{}{\diagdown\diagup}}$ $\longrightarrow$ Formula (C)

Formula (E) + $n$CHRCHR$\underset{O}{\overset{}{\diagdown\diagup}}$ $\longrightarrow$ Formula (C)

The acrylic esters of this invention can be formulated as having the structures

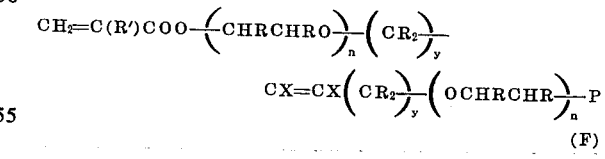
(F)

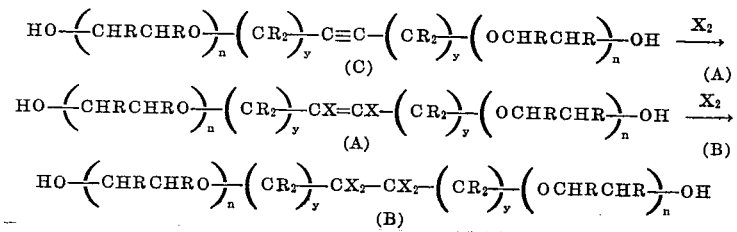

The alcohols of Formula (C) are derivatives of acetylene, easily prepared from acetylene, and a number of which are commercial products. When in Formula (C) both $n$'s are zero and $y$ is one, these acetylenic diols have Formula (D), $HOCR_2C \equiv CCR_2OH$, and are prepared from acetylene by

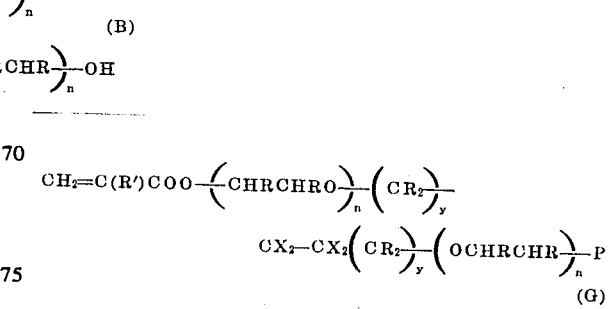
(G)

wherein P represents OH and $CH_2 = C(R')COO-$ and in which R', R, $n$, $y$ and X have the same meaning as defined hereinabove.

Typical R hydrocarbon groups are methyl, ethyl, propyl, butyl, amyl, hexyl, heptyl, nonyl, decyl, phenyl, tolyl, xylyl, ethylphenyl, naphthyl, methylnaphthyl, phenethyl, benzyl, phenylpropyl, naphthylmethyl, cyclohexyl, cycloheptyl, methylcyclohexyl, ethylcycloheptyl, cyclohexylethyl, etc.

The esters of this invention are useful with their halogen content as flame retardants and for the preparation of flame-retardant compositions. They are particularly useful for the preparation of homopolymers as well as copolymers with other vinyl type monomers, including other esters of this invention. Also, these esters find utility not only as monomers but also as plasticizers and fire-retardant additives to other non-polymeric as well as polymeric materials. Especially are they suited as the vinyl monomer, alone or with other monomers, for coreaction with the unsaturated polyesters, typical examples of which are the polyalkylene maleates and fumarates, as well as those unsaturated polyesters modified by non-olefinic polycarboxylic acids such as phthalic, tetrachlorophthalic, tetrabromophthalic or chlorendic anhydride.

The polymerizable monomers of this invention, as illustrated, for example, by the acrylate, methacrylates, etc., are readily polymerized or copolymerized to polymers by radical generating initiators, such as the peroxides, hydroperoxides, peracetates or by redox systems including hydrogen peroxide with ferrous salts or sodium bisulfite, potassium or sodium persulfate with bisulfite, etc.; ultraviolet light, etc. Radical polymerizations are well known in polymer science and are applicable to the monomers of this invention.

The product of soluble polymers, especially from the monoacrylic esters of formula (F), rous sulfate, etc.

Thus, the polymers and copolymers of this invention can be prepared by the vinyl type polymerization by means of radical initiators such as the peroxy and azo catalysts as such or as redox systems as well as by ultraviolet and ionizing radiation. Of the azo-type catalysts, azobisisobutyronitrile is a typical example and is especially preferred. The peroxy catalysts are illustrated by stearoyl, lauroyl and butyroyl peroxide but for economic reasons benzoyl peroxide, tertiary butyl peroxide and tertiary butyl peracetate are preferred, but any of the other well-known peroxy catalysts such as cumene peroxide and the like can also be used.

The diacrylic esters yield insoluble crosslinked polymers and copolymers, whereas the monoacrylic esters yield soluble polymers.

When solutions of the non-crosslinked polymers are desired, they can be obtained readily by polymerization in a suitable organic solvent or a mixture of organic solvents such as methyl acetate, ethyl acetate, acetone, methylethyl ketone, methylisobutyl ketone, benzene, toluene, xylene, dioxane, tetrahydrofuran, chloroform, carbon tetrachloride, ethylenedichloride, dibutyl ether, etc. In such cases a solution of 5 to 75 percent of the monomer in the solvent is used.

When low molecular weight polymers are desired, the amount of radical initiator used may be as high as 3 to 4 percent by weight of the monomer or comonomers used; and the molecular weight may be further controlled by the use of radical chain transfer agents such as chloroform, carbon tetrachloride, octyl mercaptan, dodecyl mercaptan and the like.

When high molecular weight polymerization products are desired, the polymerizations are performed preferably in the absence of chain transfer agents and only sufficient initiator to

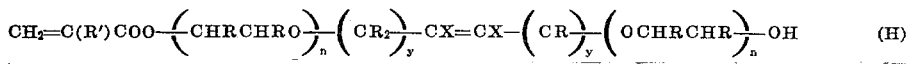

$$CH_2=C(R')COO-(CHRCHRO)_n-(CR_2)_y-CX=CX-(CR_2)_y-(OCHRCHR)_n-OH \qquad (H)$$

which contain two double bonds is surprising, particularly since other acrylic esters having two double bonds, such as $CH_2 = CHCOOCH_2CH = CH_2$, and $CH_2 = CHCOOCH_2C = CH$, crosslink under radical polymerization as shown in J. Polymer Sci., 5, 323–337, 813–832, 994,1014 (1967).

The solubility of polymers of Formula (H) permits them to be used as modifiers of other polymers, for example, as a coreactant in polyurethane formulations.

Furthermore, the new esters of this invention cannot be prepared by first synthesizing the acrylic esters of the acetylenic diols and then halogenating the acrylic ester, because the halogenation is not selective and causes halogenation, simultaneously, of all or most of the vinyl bonds in the acrylic ester, thereby destroying the polymerizability of the compound, for example, overcome the induction period of the system, such as of the order of 0.025 to 0.1 percent by weight of initiator. Alternately, the polymerization may be achieved thermally, simply by heating to generate the initiating radicals.

The polymerization can be performed over a wide range of temperatures depending upon whether the system is a mass, a solution or an emulsion polymerization and whether the initiation is by a redox system, ultraviolet or ionizing radiation. With ionizing radiation, polymerization can be achieved at −40° C.; the redox polymerizations can be performed at 0° to 70° C.; and the thermal polymerizations can be performed up to temperatures of the order of 100°–125° C. or higher.

The new monomers of this invention can be copolymerized with other vinyl monomers, such as the acrylic and methacrylic esters such as the methyl, ethyl, propyl, butyl, hexyl,

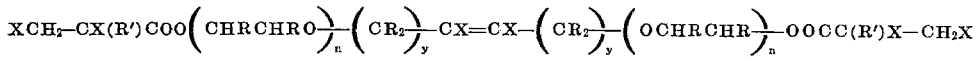

$$XCH_2-CX(R')COO(CHRCHRO)_n-(CR_2)_y-CX=CX-(CR_2)_y-(OCHRCHR)_n-OOCC(R')X-CH_2X$$

The monomers of this invention homopolymerize and copolymerize readily such as by means of radical type initiators, ultraviolet light, ionizing radiation or thermally. The homopolymerizations and copolymerizations may be performed (1) in mass, that is, neat, in the absence of added solvents or dispersion media; (2) in suitable organic substances which are solvents for the monomers as well as the polymers, or which are solvents for the monomers and not for the polymers, in which cases the polymers precipitate from the media; or (3) in emulsion systems which are well known in the art and which comprise an emulsifying agent such as soaps, synthetic emulsifiers, such as dodecylbenzene sulfonate sodium salts, sodium sulfodioctylsuccinate and the like, in water. In the emulsion systems, water-soluble radical initiators such as potassium persulfate, hydrogen peroxide, sodium perborate, urea peroxide, etc., are used alone or in the presence of a redox agent, such as sulfur dioxide, sodium bisulfite, fercyclohexyl, dodecyl, etc. esters. In addition to, or in lieu of these acrylic-type esters used in copolymerization to prepare the starting polymer, any other copolymerizable monovinyl or monovinylidene comonomer or mixtures thereof can be used, for example, the vinyl esters, that is, vinyl acetate, and the monovinyl esters of saturated and unsaturated, aliphatic, monobasic and polybasic acids, and more specifically the vinyl esters of the following acids: propionic, isobutyric, valeric, caprylic, caproic, oleic, stearic, acrylic, methacrylic, crotonic, oxalic, malonic, succinic, glutaric, adipic, suberic, azelaic, maleic, fumaric, itaconic, mesaconic, hexahydrobenzoic, citric, trimesic, etc., as well as the corresponding allyl, methallyl, etc. esters of the aforementioned acids, methacrylic acid, hydroxy propyl methacrylate, etc.; itaconic acid monoesters and diesters, such as the methyl ethyl, butyl esters, the maleic and fumaric acid monoesters, diesters and their amide and nitrile compounds, such as diethyl maleate, maleyl diamide, fumaryl dinitrile, dimethyl fumarate, etc.; acrylonitrile, methacrylonitrile, etc.; ethers such as methallyl ethyl ether, vinyl ethyl ether, vinyl butyl ether, allyl propyl ether; cyanuric acid derivatives having one copolymerizable unsaturated group attached directly or indirectly to the triazine ring, such as allyl diethyl cyanurate, vinyl diethyl cyanurate, as well as the partial, soluble or fusible polymerizable polymers of the hereinabove listed monomers, etc.

Typical suitable aromatic comonomers include vinyl aryl compounds such as styrene, vinyl naphthalene, vinyl toluene, vinyl xylene, vinyl phenol, vinyl ethyl benzene, vinyl dimethyl naphthalene, vinyl diphenyl, etc., vinyl phenyl ether, vinyl benzoate, vinyl naphthoate, vinyl methyl phthalate, allyl ethyl phthalate, allyl propyl phthalate, etc.

The polymeric compositions of this invention are particularly useful in coating compositions on all types of substrates, including cellulose in its various forms, such as paper, wood, paper board, wood board, wood pulp, regenerated cellulose in film or fiber form, laminates of various types including those prepared from fibrous fillers bonded with urea, melamine, epoxy and polyester resins, plaster board, concrete in its various forms such as slabs, blocks and the like. They may also be used as impregnants for porous bodies such as the compositions hereinabove named, as well as for synthetic and natural sponges, etc. Particularly do they find use as bonding agents and adhesives for solid, porous and foamed bodies. They can be used alone or admixed with each other or with other copolymerizable monomers, unsaturated or saturated polymers, in the absence or presence of dyes, pigments, plasticizers. For coating, impregnating or adhesive compositions where the presence of small amounts of solvent in the cured composition is not objectionable they can be mixed with volatile or non-volatile solvents best suited to the particular application.

The polymers of this invention are also useful in the preparation of copolymers with unsaturated alkyd resins. In carrying this portion of the invention into effect, an esterification product of a polyhydric alcohol and an $\alpha,\alpha$-unsaturated polycarboxylic acid is first prepared in accordance with techniques now well-known to those skilled in the alkyd resin art, such as ethylene glycol maleate, propylene glycol maleate, ethylene glycol maleate-phthalate, ethylene glycol maleate-acrylate, propylene glycol-fumarate-methacrylate and the like.

In many cases, instead of copolymerizing a single monomer of this invention with a single alkyd resin, mixtures can be used of two or more such monomers with a single alkyd resin, or a single monomer can be used with two or more alkyd resins or a mixture of two or more monomers with two or more alkyd resins.

The polymers of this invention can be used alone or with fillers, dyes, pigments, opacifiers, lubricants, plasticizers, natural and synthetic resins or other modifying bodies in, for example, casting, molding, laminating, coating applications, and as adhesives, impregnants and protective coatings.

In preparing copolymers, the monomers of this invention can constitute as much as 98–99.5 percent by weight of the whole, or the modifying comonomer or alkyd resin can constitute 98–99.5 percent of the whole.

In general, the proportions of the components used in a particular formation will depend upon the particular properties desired in the interpolymer. For most applications, it is preferred to use 20 to 80 percent of the monomers of this invention and from 80 to 20 percent of the modifying polymer or monomer, since within these ranges interpolymers best adapted for most commercial applications can be produced.

Within these ranges the new interpolymers have a wide range of properties. For example, depending upon the particular crosslinking polymer and any modifying polymer or monomer, the particular proportions thereof, the conditions of polymerization, such as the temperature, pressure, presence or absence of additives, etc., and the extent of polymerization, they can vary from soft flexible bodies to hard rigid masses of varying resistance to solvents.

For coating or impregnating applications where the presence of a small amount of solvent in the cured composition is not objectionable, the mixed starting component can be diluted with volatile or nonvolatile solvents or diluents best suited for the particular service application, and then can be polymerized after the application of the solution to the particular article to be coated or impregnated, or impregnated and coated. By suitable selection of the starting material and the conditions of the interpolymerization, interpolymers can be obtained in an insoluble, infusible state practically resistant to the destructive effect of other chemical bodies, such as acid, bases, salts, solvents, swelling agents, and the like.

When it is desired to modify the properties of the crosslinkable monomers of this invention, this can be accomplished by copolymerizing a mixture comprising at least one such polymer with at least one copolymerizable monomer containing at least one unsaturated ethylenic, or acetylenic hydrocarbon radical, more particularly, a

radical, such as vinyl, allyl, methallyl, vinylidene, etc., or with a copolymerizable compound containing a -CH = CH-, or a

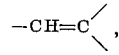

or a

grouping, for example, as in vinylidene fluoride, vinylidene cyanide, vinyl propionate, maleic anhydride, or its esters and amides, methyl maleic anhydride, tetrafluoroethylene, etc.

Additional examples of copolymerizable comonomers are monomeric or partially polymerized vinyl esters, such as the acetate, propionate, etc., vinyl ketones, methyl vinyl ketones, olefinic nitriles, such as acrylonitrile, methacrylonitrile, fumaryl nitrile, beta-cyano-ethylacrylate, acrylic and methacrylic esters, for example, methyl acrylate, ethyl acrylate, propyl acrylate, butyl acrylate, ethyl methacrylate, propyl methacrylate, butyl methacrylate, octyl methacrylate, glycol dimethacrylate, allyl methacrylate, etc.; itaconic esters, for example, diamyl itaconate, divinyl itaconate, diallyl itaconate; olefinic amides, for example, acrylamide, itaconamide, the maleic mono- and diamides, and the corresponding imides, etc., the vinyl ethers, for example, vinyl hexyl ether, vinyl isobutyl ether, vinyl cyclohexyl ether, the dienes, etc., for example, butadiene, isoprene, dimethyl butadiene, etc., the o-, m- and p-methyl and chloro styrenes, etc.

In preparing copolymers of the crosslinkable monomers with polymerizable comonomers such as methyl methacrylate, styrene, acrylonitrile, and the like, the crosslinkable polymer can constitute as little as 0.1 percent by weight of the whole, whereas in other cases the crosslinkable polymers can constitute as much as 98–99 percent of the whole. The proportion of the components in a particular formulation will depend upon the particular comonomers used and the particular properties desired in the copolymer. The polymers and copolymers can be prepared most readily by ionizing radiation.

The acrylic monomers of this invention are particularly suitable for grafting to polymers in fiber form, by techniques well-known in the art to render the fibers non-burning, such as to the polymer fibers and textiles of nylon, polyvinyl alcohol, regenerated cellulose, cotton, etc. One particularly useful method is to form a redox metal complex of either acidic cellulose or a xanthated cellulose and to graft the monomer directly to the cellulose.

Various methods of practicing the invention are illustrated by the following examples. These examples are intended to illustrate the invention and not in any sense to limit the manner in which the invention can be practiced. The parts and percentages recited therein and all through this specification, unless specifically provided otherwise, refer to parts by weight and percentages by weight.

EXAMPLE I a. To 86 parts of 2-butyne diol, $HOH_2C \equiv CCH_2OH$, in 350 parts of $CCl_4$ is added slowly with stirring at 0°–25° C. 161 parts of bromine in 625 parts of $CCl_4$ and the reaction allowed to continue, after the bromine addition, for 3 hours at 25°–40° C. The reaction mixture is then washed first with aqueous 10 percent $Na_2CO_3$, then with distilled water following which, the $CCl_4$ layer is separated, dried over anhydrous sodium sulfate, decolorized with activated carbon, filtered, and the $CCl_4$ removed by distillation at reduced pressure, leaving an almost quantitative yield of $HOCH_2CBr = CBrCH_2OH$, melting point on recrystallization, 116.5°–117° C. The elemental analysis yields values of 19.47 percent C and 65.06 percent Br, which are in good agreement with the theoretical values.

b. When procedure (a) above is repeated using 322 parts of bromine instead of 161 parts, there is obtained the tetrabromo derivative, $HOCH_2CBr_2—CBr_2CH_2OH$, 78.7 percent bromine, which is in close agreement with the theoretical value.

c. Into a stirred solution of 86 parts of $HOH_2CC \equiv CCH_2OH$ in 500 parts of $CCl_4$, maintained at 10°–15° C., is slowly passed a stream of chlorine until 71 parts of $Cl_2$ are reacted. Then the solution is purified by the procedure of Example I(a) above, yielding $HOCH_2CCl = CClCH_2OH$, m.p. 78° C., which on analysis for chlorine yields a value of 45.26 percent, which is close to the theoretical value for the compound.

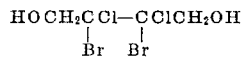

d. The above procedures are typical of those used to prepare the following dihalo- and tetrahalo-diols from which the acrylic esters are prepared.

Bromination of this compound by the procedure given in Example I(a) yields the product

EXAMPLE II

The following is a typical procedure for preparing diesters of the halogenated diols.

To a mixture of 800 parts of dry benzene, 1 part of tertiary butyl catechol, 1 mole of halogenated diol and 2 moles of triethylamine, cooled to 5° C., there is added slowly with stirring two moles of the acid chloride (209 parts of $CH_2 = C(CH_3)COCl$ or 181 parts of $CH_2 = CHCOCl$) over a period of 2 hours. The mixture is then filtered to remove triethylamine hydrochloride and hexane is added to the filtrate until the solution becomes turbid. The solution is again filtered, decolorized with activated carbon and further purified by passing the solution through a column of chromatographic alumina or silica. The solvent is then removed from the solution at reduced pressure of 1 to 50 mm Hg leaving the diester as a clear, viscous oil. The diesters so prepared can be used directly, but if further purification is desired or required, such purification is readily accomplished in a falling film evaporator. The anhydrides of acrylic and methacrylic acid, $[CH_2 = C(R)CO]_2O$, can be used instead of the acid chlorides. By the use of the above procedure, the acrylic esters and the methacrylic esters of dihalo-diols, (1) to (11) inclusive, and of the tetrahalo-diols, (a) to (h) inclusive, are readily prepared, whose elemental analyses for halogen are in good agreement with the calculated values, as illustrated by the analysis of some typical diesters.

Similarly, the chloroacrylic esters and the bromoacrylic esters are prepared by using the halogenated acid chlorides, $CH_2 = C(Cl)COCl$ and $CH_2 = C(Br)COCl$, respectively.

EXAMPLE III

To a mixture of 500 parts of dry benzene, 1 part of tertiary butyl catechol, 59 parts of trimethylamine, and 250 parts of $HOCH_2CBr = CBrCH_2OH$, cooled to 5° C., there is added slowly with stirring over a period of 4 hours, 90 parts of $CH_2 =$

| Dihalo-diols | Tetrahalo-diols |
|---|---|
| 1. $HOCH_2CBr=CBrCH_2OH$<br>2. $HOCH_2CCl=CClCH_2OH$<br>3. $HOCH_2CH_2CBr=CBrCH_2CH_2OH$ | a. $HOCH_2CBr_2—CBr_2CH_2OH$<br>b. $HOCH_2CCl_2—CCl_2CH_2OH$<br>c. $HOCH_2C(Br)(Cl)—C(Br)(Cl)CH_2OH$ |
| 4. $HOCH(CH_3)CH_2CBr=CBrCH_2CH(CH_3)OH$ | d. $\overset{CH_3}{\underset{CH_3}{HOC}}—CBr_2CBr_2\overset{CH_3}{\underset{CH_3}{C}}—OH$ |
| 5. $HOCH(CH_3)CBr=CBrCH(CH_3)—OH$ | e. $HOCH_2CH_2CBr_2—CBr_2CH_2CH_2OH$ |
| 6. $HOCH(C_6H_5)CBr=CBrCH(C_6H_5)OH$ | f. $\overset{CH_3}{\underset{CH_3}{HOC}}—CCl_2CCl_2\overset{CH_3}{\underset{CH_3}{C}}—OH$ |
| 7. $HOC(CH_3)_2CBr=CBrC(CH_3)_2OH$ | g. $\overset{CH_3}{\underset{}{HOC}}—HCBr_2CBr_2\overset{CH_3}{\underset{}{C}}—HOH$ |
| 8. $HOC(CH_3)_2CCl=CClC(CH_3)_2OH$<br>9. $HOOCH_2CBr=CBrCH_2OOH$<br>10. $[HOOCH(CH_3)CH_2OCBr=]_2$<br>11. $HOC(CH_3)(C_2H_5)CBr=CBrC(CH_3)(C_2H_5)OH$ | h. $\overset{CH_3}{\underset{}{HOC}}—HCCl_2CCl_2\overset{CH_3}{\underset{}{C}}—HOH$ |

| Number | Structure | Percent halogen |
|---|---|---|
| A.1 | $[CH_2=CHCOOCH_2CBr=]_2$ | 45.26 |
| A.2 | $[CH_2=CHCOOCH_2CCl=]_2$ | 26.76 |

| Number | Structure | Percent halogen |
|---|---|---|
| A.3 | $[CH_2=CH-COOCH_2CH_2CBr=]_2$ | 41.85 |
| A.7 | $[CH_2=CHCOOC(CH_3)_2CBr=]_2$ | 38.48 |
| A.8 | $[CH_2=CHCOOC(CH_3)_2CCl=]_2$ | 22.02 |
| MA.1 | $[CH_2=C(CH_3)COOCH_2CBr=]_2$ | 41.90 |
| MA.2 | $[CH_2=C(CH_3)COOCH_2CCl=]_2$ | 24.30 |
| MA.3 | $[CH_2=C(CH_3)COOCH_2CH_2CBr=]_2$ | 38.53 |
| MA.7 | $[CH_2=C(CH_3)COOC(CH_3)_2CBr=]_2$ | 36.80 |
| MA.8 | $[CH_2=C(CH_3)COOC(CH_3)_2CCl=]_2$ | 20.21 |
| MA.10 | $[CH_2=C(CH_3)COOCH(CH_3)CH_2OCH(CH_3)CH_2OCBr=]_2$ | 30.50 |
| A.a | $[CH_2=CHCOOCH_2CBr_2-]_2$ | 62.01 |
| A.b | $[CH_2=CHCOOCH_2CCl_2-]_2$ | 42.14 |
| A.d | $[CH_2=CHCOOC(CH_3)_2CBr_2-]_2$ | 55.75 |
| A.f | $[CH_2=CHCOOC(CH_3)_2CCl_2-]_2$ | 36.06 |
| MA.a | $[CH_2=C(CH_3)COOCH_2CBr_2-]_2$ | 58.58 |
| MA.b | $[CH_2=C(CH_3)COOCH_2CCl_2-]_2$ | 38.60 |
| MA.d | $[CH_2=C(CH_3)COOC(CH_3)_2CBr_2-]_2$ | 53.00 |
| MA.f | $[CH_2=C(CH_3)COOC(CH_3)_2CCl_2-]_2$ | 33.70 |

CHCOCl. The mixture is then filtered to remove precipitated trimethylamine hydrochloride, and hexane is added to the filtrate until the solution becomes turbid, is then refiltered, decolorized with activated carbon and passed through a chromatographic column of silica. The benzene is then removed at 1 to 5 mm Hg pressure leaving the product as a clear viscous oil. Its infrared spectrum shows strong bands for a free hydroxyl in the 3 micron region along with the typical bands expected for the acrylic ester linkages in the 12.34 $\mu$ region. Vapor phase chromatography indicates that the product consists primarily of monoester and about 11.2 percent of diester which corresponds to A.1 of Example II. Separation of the mono- and diesters is accomplished readily in a falling film evaporator at 0.05 mm Hg pressure. The elemental analysis of 39.43 percent bromine for the fraction showing the free-hydroxyl group, is in good agreement with the calculated value for the compound, $CH_2 = CHCOOCH_2CBr = CBrCH_2OH$. By the above procedure the acrylic-type esters of the dihalo-diols, (1) to (11) inclusive, of the tetrahalo-diols, (a) to (h) inclusive, are readily prepared. These are converted to the ethylene glycol, diethylene glycol and triethylene glycol derivatives by reacting the hydroxy group with 1, 2 and 3 moles of ethylene oxide in the presence of a small amount of sodium hydroxide. These monohydroxy derivatives are then converted by reaction of the respective terminal hydroxy groups with acrylyl chloride to diacrylates of this invention in which the second $n$ of the formula is 1, 2 or 3.

Various typical derivatives are illustrated as follows:

(11) $CH_2=CHCOOCH_2CBr=CBrCH_2OCH_2CH_2OH$
(12) $CH_2=CHCOOCH_2CBr=CBrCH_2(OCH_2CH_2)_2OH$
(13) $CH_2=CHCOOCH_2CBr=CBrCH_2(OCH_2CH_2)_3OH$
(14) $CH_2=CHCOOCH_2CBr_2-CBr_2CH_2OCH_2CH_2OH$
(15) $CH_2=CHCOOCH_2CBr=CBrCH_2OCH_2CH_2OOCCH=CH_2$
(16) $CH_2=CHCOOCH_2CBr=CBrCH_2(OCH_2CH_2)OOCCH=CH_2$
(17) $CH_2=CHCOOCH_2CBr=CBrCH_2(OCH_2CH_2)_3OOCCH=CH_2$
(18) $CH_2=CHCOOCH_2CBr_2-CBr_2CH_2OCH_2CH_2OOCCH=CH_2$

Where it is desired to have a free hydroxy on the shorter side of the molecule, that is on the side where n equals zero, this can be done by temporarily blocking one hydroxy group of the starting halogenated diol for example by attaching an easily removable ester group such as carbonate or formate, then attaching the glycol, diethylene glycol or triethylene glycol radical and thereto attaching the acrylate ester group, and then removing the temporary blocking group to free the hydroxy group. In this way the following typical compounds are prepared:

(19) $HOCH_2CBr=CBrCH_2OCH_2CH_2OOCCH=CH_2$
(20) $HOCH_2CCl=CClCH_2(OCH_2CH_2)_2OOCCH=CH_2$
(21) $HOCH_2CBr_2-CBr_2CH_2(OCH_2CH_2)_3OOCCH=CH_2$

EXAMPLE IV

The following unsaturated polyesters are prepared, as illustrative of the class of unsaturated alkyd resins, by heating the ingredients in an inert nitrogen or carbon dioxide atmosphere.

| Alkyd Resin A | Ethylene glycol maleate |
|---|---|
| | (parts by weight) |
| Ethylene glycol | 68.0 |
| Maleic anhydride | 98.0 |

The components are mixed and slowly heated in the course of 1 hour to 180° C. and held at this temperature for 4 to 6 hours, until the acid number is reduced to below 40.

| Alkyd Resin B | Ethylene glycol-maleate-phthalate |
|---|---|
| | (parts by weight) |
| Ethylene glycol | 68.2 |
| Maleic anhydride | 49.0 |
| Phthalic anhydride | 74.0 |

The compounds are mixed and heated according to the procedure given above for Alkyd Resin A.

| Alkyd Resin C | Propylene glycol-tetrabromophthalate |
|---|---|
| | (parts by weight) |
| Propylene glycol | 68.2 |
| Maleic anhydride | 65.0 |
| Tetrabromophthalic anhydride | 140.0 |

The compounds are mixed and heated slowly to 190° C. and held at this temperature for 3 hours, then raised to 200° C. until the acid number is at least 40 or lower.

EXAMPLE V

To 50 parts of $[CH_2 = CHCOOCH_2CBr]_2$ (Monomer A.1 of Example II) in a glass tube, is added 0.5 parts of benzoyl peroxide and the mixture stirred at 25° C. until the radical initiator is dissolved; the tube is then sealed under nitrogen and heated at 75° C. for 24 hours and 100° C. for 24 hours. There is obtained a clear, almost water white, insoluble, crosslinked polymer which, when ignited, and the source of flame withdrawn, is self-extinguishing and does not continue to burn.

EXAMPLE VI

The procedure of Example V is repeated 22 times individually with the remaining respective monomers of Example II, (A.2), (A.3), (A.7), (A.8), (MA.1), (MA.2), (MA.3), (MA.7), (MA.8), (MA.10), (A.a), (A.b), (A.d), (A.f), (MA.a), (MA.b), (MA.d), and (MA.f), and monomers (15), (16), (17) and (18) of Example III, and in all cases crosslinked, infusible, insoluble polymers with self-extinguishing properties are obtained.

EXAMPLE VII

The procedure of Example V is repeated using 50 parts of $CH_2 = CHCOOCH_2CBr = CBrCH_2OH$ and there is obtained a clear thermoplastic, rubbery polymer which is soluble in chloroform and which is self-extinguishing. Similar results are obtained when the monomers (11), (12), (13), (14), (19), (20), and (21) of Example III are used individually in this polymerization procedure.

EXAMPLE VIII a. A mixture of 90 parts of methyl methacrylate and 10 parts of $CH_2 = CHCOOC(CH_3)_2CBr = CBrC(CH_3)_2OOCHC = CH_2$ is copolymerized by the procedure of Example V and there is obtained a self-extinguishing, crosslinked copolymer.

b. A mixture of 95 parts of methyl methacrylate and 5 parts of $[CH_2 = C(CH_3)COOCH_2CBr_2]_2$ — is copolymerized by the procedure of Example V and there is obtained a crosslinked, self-extinguishing copolymer.

c. A mixture of 75 parts of methyl methacrylate and 25 parts of $[CH_2 = C(CH_3)COOCH_2CH_2OCH_2CBr]_2$ is copolymerized with the procedure of Example V and there is obtained a crosslinked, self-extinguishing copolymer.

d. A mixture of 50 parts of methyl methacrylate and 50 parts of $CH_2 = CHCOOCH_2CH_2CBr = CBrCH_2CH_2OH$ is polymerized by the procedure of Example V and a thermoplastic self-extinguishing copolymer is obtained.

EXAMPLE IX

Each of the procedures of Examples VIII(a), VIII(b) and VIII(c) is repeated six times using individually instead of methyl methacrylate, the same weights of methyl acrylate, styrene, acrylonitrile, beta-cyanoethyl methacrylate and vinyl chloroacetate respectively, and in all cases, crosslinked, self-extinguishing polymers are obtained.

EXAMPLE X a. To each of 50 parts of alkyd resins A, B and C respectively are added 50 parts of
$CH_2 = C(CH_3)COOC(CH_3)_2CBr = CBrC(CH_3)_2OOCC(CH_3) = CH_2$
and 0.20 parts of tertiary butyl hydroperoxide and fiberglass mats are impregnated according to procedures well known in the art to 45 percent resin contents. A three-ply laminate is prepared and placed between two layers of polyethylene film and cured for 2 hours at 100° C. and 4 hours at 125° C. The cured laminate when tested for flame-resistant properties by A.S.T.M. Method D–635–44 is found to be non-burning and self-extinguishing.

b. The procedure of Example X(a) is repeated but 25 parts of $CH_2 = C(CH_3)COOC(CH_3)_2CBr = CBrC(CH_3)_2OOCC(CH_3) = CH_2$ is replaced in separate tests by 30 parts of styrene, methyl methacrylate, vinyl acetate, triallyl cyanurate and triallyl isocyanurate respectively, and in all cases, non-burning, self-extinguishing laminates are obtained.

c. The procedures of Examples X(a) and X(b) are repeated using instead of monomer (MA.7) monomers (A.1), (A.2), (A.8), (MA.10), (A.a), (A.f) and (MA.a), and in all cases, self-extinguishing laminates are obtained.

EXAMPLE XI

Under a nitrogen atmosphere, 50 parts of
$[CH_2 = CHCOOCH_2CBr]_2$ containing 0.5 parts of azoisobutyronitrile is added to 20 parts of poly(cis-butadiene) and the mixture stirred at 25° C. until it is homogeneous; then the mixture is heated at 70° C. for 10 hours and at 120° C. for 16 hours and there is obtained a crosslinked self-extinguishing polymerizate which is tough and exhibits impact properties.

EXAMPLE XII

The following mixtures are first prepared:

|     |                                                                 | Parts |
| --- | --------------------------------------------------------------- | ----- |
| (A) | Methyl methacrylate                                             | 75.0  |
|     | $[CH_2=CHCOOCH_2CBr_2]_2$                                       | 25.0  |
|     | Benzophenone                                                    | 0.2   |
| (B) | Methyl methacrylate                                             | 65.0  |
|     | $CH_2=C(CH_3)COOCH_2CCl=CClCH_2OOCC(CH_3)=CH_2$                 | 25.0  |
|     | $PO(OCH_2CH=CH_2)_3$                                            | 10.0  |
|     | Benzophenone                                                    | 0.2   | and then irradiated with ultraviolet light from a 100-watt mercury lamp until the mixtures become solid and hard. In both cases, self-extinguishing polymers are obtained.

EXAMPLE XIII

The following mixtures are first prepared:

|     |                                                                 | Parts |
| --- | --------------------------------------------------------------- | ----- |
| (A) | $[CH_2=CHCOOCH_2CBr_2]_2$                                       | 20    |
|     | $CH_2=C(CH_3)-COOCH_3$                                          | 80    |
| (B) | $[CH_2=CHCOOC(CH_3)_2CBr_2]_2$                                  | 20    |
|     | $CH_2=C(CH_3)-COOC_2H_5$                                        | 80    |
| (C) | $[CH_2=C(CH_3)COOC(CH_3)_2CBr_2]_2$                             | 10    |
|     | $CH_2=C(CH_3)-COOCH_3$                                          | 80    |
|     | $CH_2=CHCOOCH_2PO(OC_2H_5)_2$                                   | 10    |
| (D) | Alkyd Resin B                                                   | 60    |
|     | $[CH_2=CHCOOCH_2CCl_2]_2$                                       | 20    |
|     | $CH_2=CHCOOCH_2CH_2OH$                                          | 5     |
|     | $CH_2=C(CH_3)-COOCH_3$                                          | 15    |

Samples of mixtures (A), (B), (C) and (D) are placed in glass vials which are swept out with nitrogen and sealed, and then each is exposed to the beam of a 1 MEV Vander Graaff accelerator and insoluble, infusible, non-burning, self-extinguishing polymers are obtained at dosages varying from 4 to 8 megarads. Similar results are obtained when other sources of ionizing radiation are used, such as from natural or synthetic radioactive material, for example, from Cobalt 60 or from the Varian type travelling wave linear accelerators or the types of accelerators described in U.S. Pat. No. 2,763,609 and British Pat. No. 762,953.

When 20 ml.-wood ply is impregnated and saturated with mixtures (A), (B), (C) and (D), then covered with 0.1 ml. polyethylene sheet and irradiated to 6 megarads as above, and the polyethylene barrier sheet removed, the resulting cured, impregnated wood is found to be dense, water-resistant, self-extinguishing and non-burning.

EXAMPLE XIV

A skein of 20 parts of cotton thread is placed in 500 parts of an aqueous solution containing 2.5 parts of NaOH, 2.5 parts of $CS_2$ and 0.05 part of sodium dodecylbenzenesulfonate and allowed to stand for 30 minutes. The thread is then removed, washed thoroughly with distilled water and immersed in 500 parts of a solution containing 0.05 parts of $FeSO_4 \cdot (NH_4)_2SO_4$ and 1.5 parts of tetra-kis-hydroxymethyl phosphonium chloride for 10 minutes. The thread is then washed with distilled water and suspended in 1000 parts of an emulsion containing 12 parts of $[CH_2 = C(CH_3)COOC(CH_3)_2CBr]_2$, 0.1 part of sodium dodecylbenzenesulfonate and 1.5 parts of hydrogen peroxide and the mixture heated with agitation at 65° C. under nitrogen for 3 hours. The thread is then removed, washed with water, and dried; there is obtained 31.8 parts of grafted threads, which, when suspended and the ends are ignited, are self-extinguishing when the source of flame is removed.

The polymerization products of the acrylate esters of this invention can be represented as having a plurality of repeating units selected from the formulas

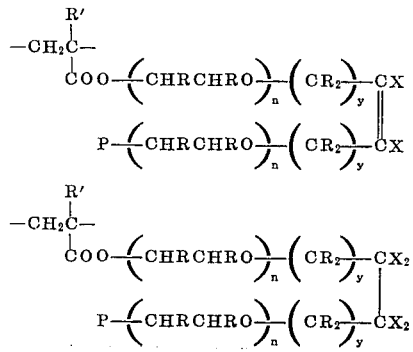

and wherein R', R, X, y, n and P are as defined above.

When P represents OH, the resulting repeating units do not form crosslinks per se.

When the formulas have P representing $CH_2 = C(R')COO-$, crosslinked repeating units will be present in the polymer molecules having a formula selected from

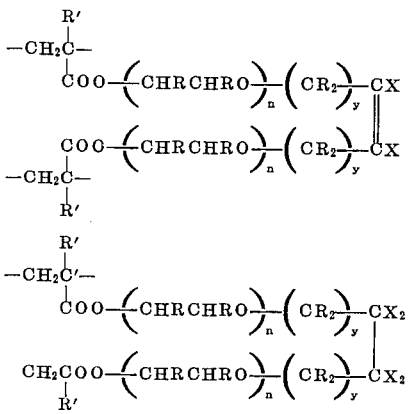

and

There are in addition to uncrosslinked repeating units in which P is $CH_2 = C(R')COO-$.

For example, with the monomer used in Example V the polymer has a plurality of repeating units therein selected from $$\begin{array}{cc}
-CH_2CH- & -CH_2CH- \\
| & | \\
COOCH_2CBr & COOCH_2CBr \\
\| \quad \text{and} & \| \\
COOCH_2CBr & COOCH_2CBr \\
| & | \\
CH_2=CH & -CH_2CH-
\end{array}$$

When both $n$'s in the basic formulas represent zero, these formulas can be abbreviated as:

$$\begin{array}{cc}
R' & R' \\
| & | \\
-CH_2C- & -CH_2C- \\
| \quad \text{and} & | \\
COO-(CR_2)_y-CX & COO-(CR_2)_y-CX_2 \\
\| & | \\
P-(CR_2)_y-CX & P-(CR_2)_y-CX_2
\end{array}$$

When P represents $CH_2=CHCOO-$ in these abbreviated formulas repeating units in polymers produced from the monomers are selected from the formulas For the dihalogens:

$$\begin{array}{cc}
R' & R' \\
| & | \\
-CH_2C- & -CH_2C- \\
| & | \\
COO-(CR_2)_y-CX \text{ and } & COO-(CR_2)_y-CX \\
\| & \| \\
COO-(CR_2)_y-CX & COO-(CR_2)_y-CX \\
| & | \\
CH_2=C-R' & -CH_2C- \\
& | \\
& R'
\end{array}$$

For the tetrahalogens:

$$\begin{array}{cc}
R' & R' \\
| & | \\
-CH_2C- & -CH_2C- \\
| & | \\
COO-(CR_2)_y-CX_2 & COO-(CR_2)_y-CX_2 \\
| \quad \text{and} & | \\
COO-(CR_2)_y-CX_2 & COO-(CR_2)_y-CX_2 \\
| & | \\
CH_2=C-R' & -CH_2C- \\
& | \\
& R'
\end{array}$$

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. The acrylic ester having a formula selected from class consisting of $$CH_2=C(R')COO-(CHRCHRO)_n-(CR_2)_y-$$
$$CX=CX-(CR_2)_y-(OCHRCHR)_n-P$$

and $$CH_2=C(R')COO-(CHRCHRO)_n-(CR_2)_y-$$
$$CX_2-CX_2-(CR_2)_y-(OCHRCHR)_n-P$$

wherein
  R' represents hydrogen, methyl or X,
  R represents hydrogen or a monovalent hydrocarbon containing one to 10 carbon atoms,
  X is a halogen selected from the class consisting of chlorine and bromine,
  $y$ represents an integer having a value of 1 or 2,
  $n$ is an integer having a value of 0 to 3 and at least one $n$ equals 0, and
  P represents OH or $CH_2=C(R')COO-$.

2. The acrylic ester of claim 1 in which $n$ is zero and P is $CH_2=C(R')COO-$.
3. The acrylic ester of claim 2 in which each $y$ is one.
4. The acrylic ester of claim 2 in which each $y$ is two.
5. The acrylic ester of claim 2 in which each X is Br.
6. The acrylic ester of claim 2 in which each X is Cl.
7. The ester of claim 3 in which $(CR_2)_y$ is $-CH_2-$.

8. The ester of claim 3 in which each $(CR_2)_y$ is $$\begin{array}{c} CH_3 \\ | \\ -CH- \end{array}$$

9. The ester of claim 3 in which $(CR_2)_y$ is $$\begin{array}{c} CH_3 \\ | \\ -C- \\ | \\ CH_3 \end{array}$$

10. The ester of claim 4 in which $(CR_2)_y$ is $-CH_2CH_2-$.
11. The ester of claim 4 in which each $(CR_2)_y$ is $$\begin{array}{c} CH_3 \\ | \\ -CH-CH_2- \end{array}$$

12. A polymerization product of the ester of claim 1 having a plurality of repeating units therein selected from the class consisting of $$\begin{array}{c}
R' \\
| \\
-CH_2C- \\
| \\
COO-(CHRCHRO)_n-(CR_2)_y-CX \\
\| \\
P-(CHRCHRO)_n-(CR_2)_y-CX
\end{array}$$

and $$\begin{array}{c}
R' \\
| \\
-CH_2C- \\
| \\
COO-(CHRCHRO)_n-(CR_2)_y-CX_2 \\
| \\
P-(CHRCHRO)_n-(CR_2)_y-CX_2
\end{array}$$

wherein R', R, X, $y$, $n$ and P are as defined in claim 1.

13. A polymerization product of claim 12 in which P represents OH.

14. A polymerization product of the ester of claim 1 having a plurality of repeating units therein selected from the class consisting of $$\begin{array}{cc}
R' & R' \\
| & | \\
-CH_2C- \quad , & -CH_2C- \\
| & | \\
COO-(CR_2)_y-CX & COO-(CR_2)_y-CX \\
\| & \| \\
COO-(CR_2)_y-CX & COO-(CR_2)_y-CX \\
| & | \\
CH_2=C-R' & -CH_2C- \\
& | \\
& R'
\end{array}$$

$$\begin{array}{c}
R' \\
| \\
-CH_2C- \\
| \\
COO-(CR_2)_y-CX_2 \\
| \\
COO-(CR_2)_y-CX_2 \\
| \\
CH_2=C-R'
\end{array}$$

and $$\begin{array}{c}
R' \\
| \\
-CH_2C- \\
| \\
COO-(CR_2)_y-CX_2 \\
| \\
COO-(CR_2)_y-CX_2 \\
| \\
-CH_2C- \\
| \\
R'
\end{array}$$

* * * * *

UNITED STATES PATENT OFFICE
CERTIFICATE OF CORRECTION

Patent No. 3,664,992  Dated May 23, 1972

Inventor(s) Gaetano F. D'Alelio

It is certified that error appears in the above-identified patent and that said Letters Patent are hereby corrected as shown below:

In the Abstract, the formulas should read:

$$HO\!-\!(CHRCHRO)_n(CR_2)_y CX\!=\!CX\!-$$
$$(CR_2)_y(OCHRCHR)_n OH$$

and $$HO\!-\!(CHRCHRO)_n(CR_2)_y CX_2\!-\!CX_2\!-$$
$$(CR_2)_y(OCHRCHR)_n OH$$

Signed and sealed this 17th day of October 1972.

(SEAL)
Attest:

EDWARD M. FLETCHER, JR.
Attesting Officer

ROBERT GOTTSCHALK
Commissioner of Patents